(12) United States Patent
Nibarger et al.

(10) Patent No.: US 7,474,513 B1
(45) Date of Patent: Jan. 6, 2009

(54) MAGNETO-RESISTIVE (MR) TRANSDUCER HAVING AN ELECTROSTATIC DISCHARGE (ESD) ELEMENT AND SEPARATION STRUCTURE IN CONTACT WITH MAGNETIC MEDIA

(75) Inventors: John P. Nibarger, Superior, CO (US); Richard H. Dee, Boulder, CO (US)

(73) Assignee: Storage Technology Corp., Louisville, CO (US)

( * ) Notice: Subject to any disclaimer, the term of this patent is extended or adjusted under 35 U.S.C. 154(b) by 428 days.

(21) Appl. No.: 11/169,387

(22) Filed: Jun. 29, 2005

(51) Int. Cl.
*G11B 5/39* (2006.01)

(52) U.S. Cl. ........................................ 360/323

(58) Field of Classification Search ................. 360/323
See application file for complete search history.

(56) References Cited

U.S. PATENT DOCUMENTS

| 5,761,009 A * | 6/1998 | Hughbanks et al. | 360/323 |
| 2005/0207069 A1* | 9/2005 | Suda | 360/323 |
| 2006/0198057 A1* | 9/2006 | Leung et al. | 360/323 |

* cited by examiner

*Primary Examiner*—A. J. Heinz
(74) *Attorney, Agent, or Firm*—Brooks Kushman P.C.

(57) ABSTRACT

A magneto-resistive (MR) transducer is capable of reading data signals magnetically recorded on a tape. The transducer includes a head-tape interface (HTI) and a MR sensor adjacent to the HTI. An electro-static discharge (ESD) element is coupled to the MR sensor, which is adapted to provide an electrical path from the MR sensor to a lower potential structure.

18 Claims, 8 Drawing Sheets

MAGNETO-RESISTIVE (MR) TRANSDUCER HAVING AN ELECTROSTATIC DISCHARGE (ESD) ELEMENT AND SEPARATION STRUCTURE IN CONTACT WITH MAGNETIC MEDIA

TECHNICAL FIELD

The present invention generally relates to magneto-resistive (MR) sensors and, more particularly, to a MR transducer having an electro-static discharge (ESD) element.

BACKGROUND

Tape drives are being improved in order to accommodate increased tape cartridge capacities and data rates. Increases in tape cartridge capacities are achievable by increasing the linear data density and the number of data tracks written across the width of tape. Increases in data rates are achievable by increasing the number of parallel data channels and the tape velocity.

Increases in tape cartridge capacities and data rates are limited by the available read back signal-to-noise ratio (SNR). This limitation results because the physical read width in linear flexible media recording systems is proportionally smaller than the physical write width in order to provide the servo system with sufficient margin to correctly position the read sensor within the previously written track during read-back operation. Thus, as the track pitch is reduced, the physical read width is proportionally reduced resulting in a decrease in the read signal and thereby a loss in SNR.

Certain read sensors use the anisotropic magneto-resistance (AMR) effect. The AMR effect causes the intrinsic resistance of an AMR sensor to be a function of the relative angle between the direction of the electric current flow in the sensor and its magnetic moment. The AMR effect has a maximum amplitude of roughly 2.5% of the intrinsic resistance of the sensor. The available signal can be increased somewhat by reducing the thickness of the sensor in order to increase its resistance or by increasing the electric current flow in the sensor. However, the absolute amplitude of the read-back signal is limited by both the maximum current density achievable without damaging the sensor film stack and the temperature rise of the sensor.

These issues can be mitigated by using read-back sensors which use the giant magneto-resistive (GMR) effect. The GMR effect results in sensor resistance changes of more than 10%. However, GMR sensors are formed from extremely thin films (<5 nm) of which several of these films (e.g., Cu, NiMn, PtMn) may have significant corrosion issues. As flexible media systems read with the sensor essentially in contact with the surface of the tape this inevitably exposes the sensor to corrosive agents, in addition to abrasion and smearing of the film stack at the sensor edge exposed to the tape. An additional drawback of GMR based devices is the adverse effects of electro-static discharge (ESD). During an ESD event, a charge build-up is rapidly dissipated through the sensor and other components of the GMR based device. The damage results in catastrophic changes such as device melting or evaporation, and/or the magnetic integrity of the device.

The above disadvantages result in significant processing and reliability issues which currently limit the use of MR (including GMR and AMR) read-back sensors in a flexible media environment such as magnetic tape.

SUMMARY

A magneto-resistive (MR) transducer is provided for reading data signals magnetically recorded on a tape. In one embodiment, the transducer includes a head-tape interface (HTI), a MR sensor, and a separation structure. An electro-static discharge (ESD) element is coupled to the MR sensor and/or the separation structure and provides an electrical path to a lower potential structure. In yet another embodiment of the MR transducer, the transducer includes the HTI, the MR sensor, and the ESD element absent the separation structure. Accordingly, the ESD element is coupled to the MR sensor and provides the electrical path from the MR sensor to the lower potential structure.

A method of forming a MR transducer, is provided, which includes depositing a MR sensor sheet film over a wafer and protecting a portion of the MR sensor sheet film with photo-resist. The method includes etching away an unprotected portion of the MR sensor sheet film to thereby leave MR sensor material on the wafer. The method also includes depositing a separation structure sheet film over the MR sensor material and the wafer. An additional step of the method is lifting off the photo-resist to remove the separation structure sheet film deposited over the MR sensor material to thereby leave the MR sensor material surrounded by separation structure material on the wafer. The method further includes depositing an electro-static discharge (ESD) element over the MR sensor and the separation structure.

Yet another step is protecting with photo-resist a portion of the MR sensor material which is to form a MR sensor and protecting with photo-resist a portion of the ESD element and the separation structure material which is to form a separation structure on an edge of the MR sensor. The method also includes milling away the unprotected portions of the MR sensor material, the ESD element and the separation structure material to thereby leave the MR sensor and the separation structure on the wafer with the separation structure being formed on an edge of the MR sensor. The method includes lapping the separation structure to define a head-tape interface with the separation structure being disposed between the edge of the MR sensor and the head-tape interface such that the separation structure physically separates the MR sensor from the head-tape interface.

DETAILED DESCRIPTION OF THE PREFERRED EMBODIMENT(S)

By way of example a system and methodology for implement the present invention is described below. The provided system and methodology may be adapted, modified or rearranged to best-fit a particular implementation without departing from the scope of the present invention.

Figure 1:
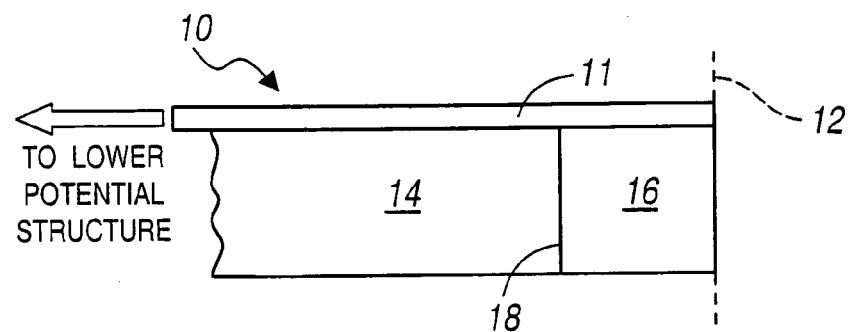
FIG. 1 illustrates a cross-sectional view of a magneto-resistive (MR) transducer in accordance with an embodiment of the present invention.

Referring now to FIG. 1, a cross-sectional view of a magneto-resistive (MR) transducer 10 in accordance with an embodiment of the present invention is shown. MR transducer 10 is to be employed in a magnetic head for reading magnetically recorded data from a magnetic medium such as tape. To this end, MR transducer 10 includes a head-tape interface 12 (i.e., a tape bearing surface) which is to be positioned adjacent to tape for the MR transducer to read data from the tape. It is recognized that MR transducer 10 may be virtually any type of MR transducer, including but not limited to, a giant magneto-resistive (GMR), anisotropic magneto-resistive (AMR) or a tunneling magneto-resistive (TMR) transducer.

MR transducer 10 generally includes an elector-static discharge (ESD) element 11, a MR sensor 14, and a separation structure 16. As is known in the art, MR sensor 14 is formed by a set of layers which form a film stack. Such layers forming the film stack of MR sensor 14 typically include free and pinned metallic ferromagnetic layers containing Ni, Fe, Co or combinations thereof. Separation structure 16 is formed on a front side or edge 18 of MR sensor 14 and physically separates the MR sensor from head-tape interface 12. That is, separation structure 16 is interposed between MR sensor 14 and head-tape interface 12 such that the MR sensor is offset from the head-tape interface. As such, separation structure 16 reduces exposure of MR sensor 14 to direct physical contact with the surface of tape at head-tape interface 12 when MR transducer 10 is reading data from the tape.

Separation structure 16 is formed of materials that are non-magnetic, ferromagnetic, or a combination of both. Separation structure 16 includes one or several films. The material(s) and film(s) defining separation structure 16 are selected such that the separation structure protects MR sensor 14 and its front surface 18 from the tape surface at head-tape interface 12 while not degrading the performance of the MR sensor 14. From the proper selection of the material(s) and film(s) used to define separation structure 16, coupling of the free and pinned layers in the film stack of MR sensor 14 can be minimized while coupling of written transitions from tape at head-tape interface 12 into the MR sensor can be maximized.

Regardless of whether the single film forming separation structure 16 is a non-magnetic or a magnetic material, the separation structure functions as an "isolation film" as it isolates MR sensor 14 from direct physical contact and exposure to head-tape interface 12.

ESD element 11 enables shunting of charges that build-up on MR transducer 10. As such, ESD element 11 contacts separation structure 16 and MR sensor 14 to provide an electrical path for dissipating charges. ESD element 11 may provide the electrical path from MR transducer 10 to a structure having a lower electrical potential such as a ground point or another structure within the head. In one embodiment, ESD element 11 may be comprised of a relatively high resistance metal having a resistance of about 10 kilo-ohms. In such an embodiment, ESD element 11 may, but not necessarily, form a serpentine resistive path. In an alternative embodiment, where ESD element 11 provides a relatively high resistance path, ESD element 11 may be comprised of an insulator that is doped with metal. In yet another embodiment, ESD element 11 may be comprised of a relatively low resistance metal in accordance with design and performance requirements.

Figure 2A:
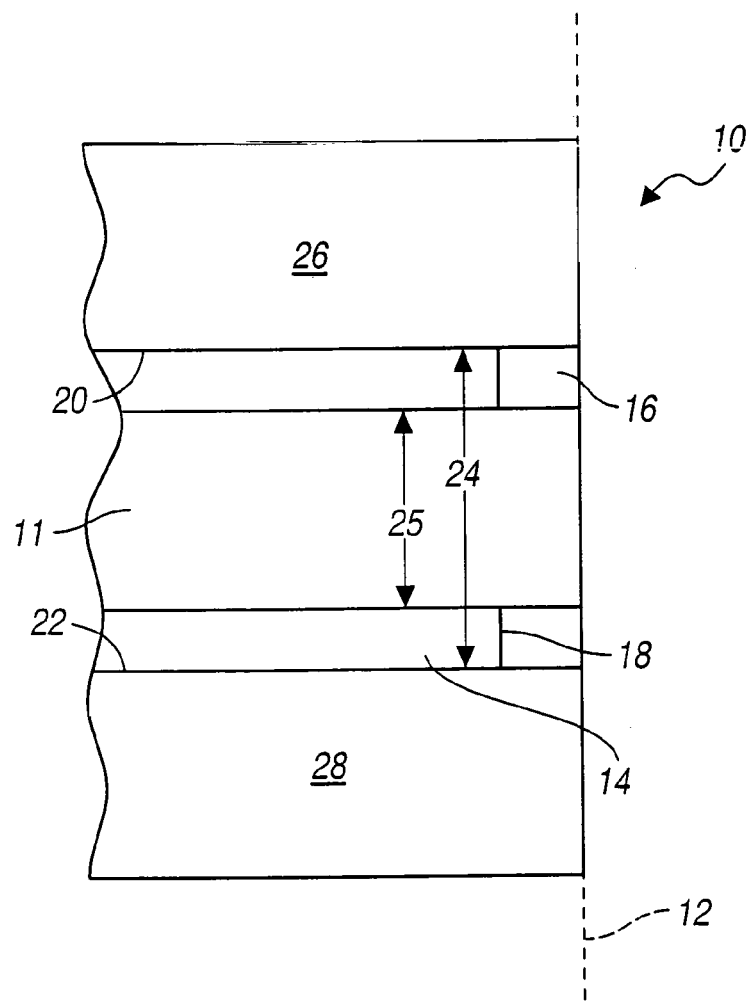
FIGS. 2A and 2B illustrate a top-down view of the MR transducer shown in FIG. 1 having alternative embodiments of an electro-static discharge (ESD) element.
Figure 2B:
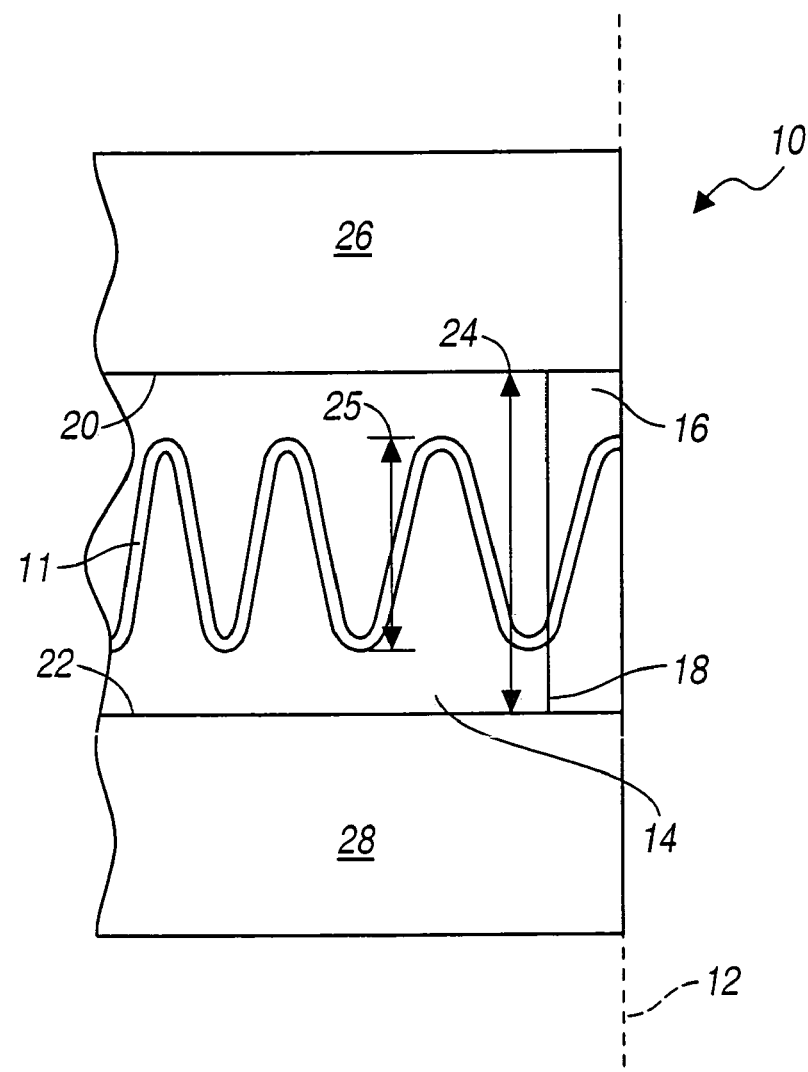

Referring now to FIGS. 2A and 2B, with continual reference to FIG. 1, a top-down view of MR transducer 10 is shown. As shown in FIG. 2A, MR sensor 14 and separation structure 16 share two side surfaces 20 and 22 which are generally normal to head-tape interface 12. Front side 18 of MR sensor 14 has a width 24 between side surfaces 20 and 22. Width 24 defines the physical read width of MR sensor 14. Separation structure 16 also has the same width 24 as MR sensor 14 and is generally formed parallel with head-tape interface 12 between side surfaces 20 and 22. Additionally, ESD element 11 is shown as a layer on top of MR sensor 14 having a width 25. As shown, width 25 of ESD element 11 is less than width 24 of MR sensor 14. However, in one aspect of the invention, so long as the resistance of ESD element 11 has a sufficient magnitude, width 25 may be the same as or greater than width 24. Such embodiments provide improved control of current flowing through separation structure 16. FIG. 2B illustrates an alternative embodiment of MR transducer 10 wherein ESD element 11 forms a serpentine resistive path. In one aspect, the serpentine resistive path enables increased resistance to current flowing throughout the head.

MR transducer 10 further includes a pair of permanent magnet (PM) films 26 and 28. PM film 26 is defined to abut MR sensor 14 and separation structure 16 along side surface 20. PM film 26 is further defined to abut and be formed parallel with head-tape interface 12 as shown in FIG. 2. Likewise, PM film 28 is defined to abut MR sensor 14 and separation structure 16 along side surface 22. PM film 28 is also defined to abut and be formed perpendicular with head-tape interface 12 as shown in FIGS. 2A and 2B. PM films 26 and 28 are patterned PM stabilization films which function to stabilize the performance of MR sensor 14 for reading magnetically recorded data from tape.

Figure 3:
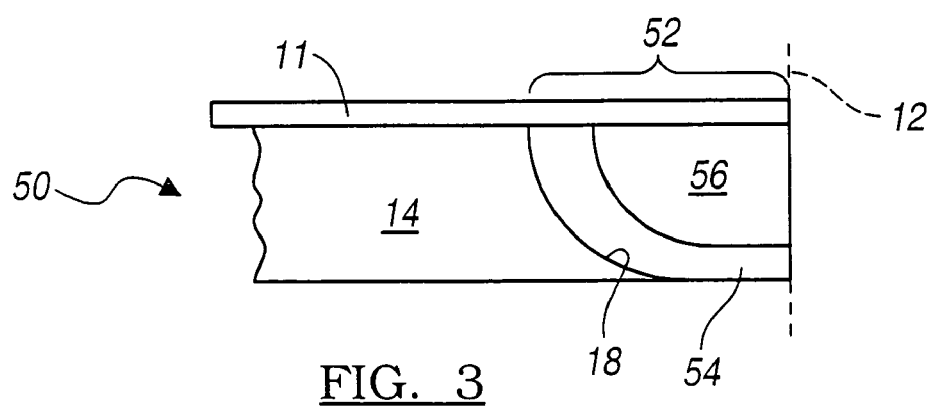
FIG. 3 illustrates a cross-sectional view of a MR transducer in accordance with another embodiment of the present invention.
Figure 4:
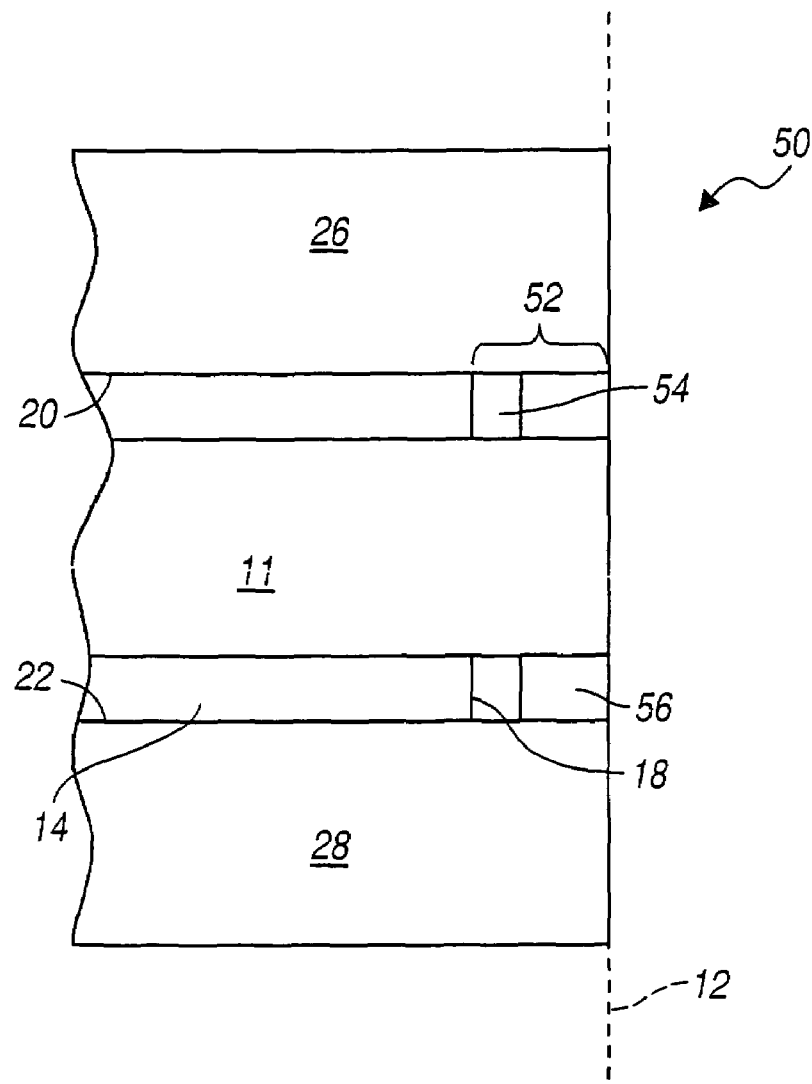
FIG. 4 illustrates a top-down view of the MR transducer shown in FIG. 3.

Referring now to FIGS. 3 and 4, cross-sectional and top-down views of a MR transducer 50 in accordance with another embodiment of the present invention are respectively shown. MR transducer 50 includes a separation structure 52 which separates front edge 18 of MR sensor 14 from head-tape interface 12. Separation structure 52 generally differs from separation structure 16 of MR transducer 10 shown in FIG. 1 in that separation structure 52 is defined from two films 54, 56 instead of just a single film. More particularly, separation structure 52 includes an under-layer film 54 and an isolation film 56.

Under-layer film 54 is interposed between front edge 18 of MR sensor 14 and isolation film 56. Under-layer film 54 is defined such that a portion of the under-layer film abuts side surface 22 and head-tape interface 12 as shown in FIG. 3. Under-layer film 54 physically isolates isolation film 56 from direct contact with MR sensor 14. Isolation film 56 is interposed between head-tape interface 12 and under-layer film 54. Isolation film 56 serves to separate MR sensor 14 and its front edge 18 from head-tape interface 12.

As an example, under-layer film 54 is formed of Cr or Ta as these materials neither propagate anti-ferromagnetic coupling between the NiFe layers (which make up the film stack of MR sensor 14) and can both be deposited with high resistivity. In either case, isolation film 56 is formed from a magnetically soft ferromagnetic material such as CoZrMo, NiFeMo, or NiFeCr in order to improve the coupling of the magnetic flux from the transitions recorded on the tape into MR sensor 14. As such, isolation film 56 functions to conduct magnetic flux into MR sensor 14 from magnetic transitions recorded in tape at head-tape interface 12. The role of under-layer film 54 is not to separate front edge 18 of MR sensor 14 from head-tape interface 12 but it is rather to ensure the correct operation of the MR sensor. Additionally, as shown, MR transducer 50 includes ESD element 11 to protect the structural and magnetic integrity of MR transducer 50 during an ESD event.

Figure 5A:
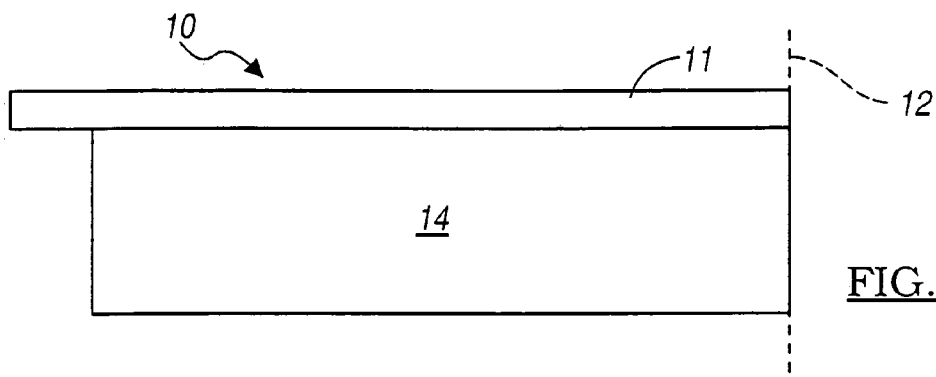
FIGS. 5A and 5B illustrate a cross-sectional and a top-down view of a MR transducer in accordance with another embodiment of the present invention.
Figure 5B:
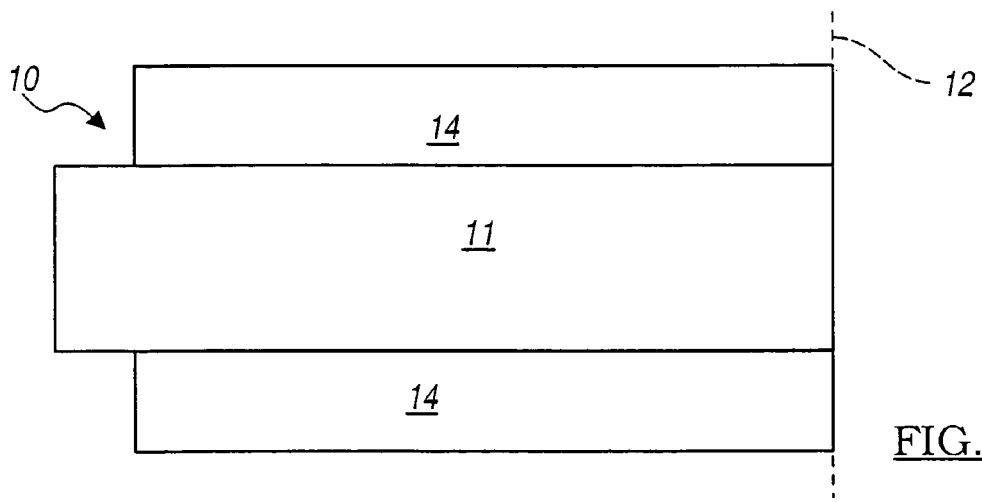

Referring to FIGS. 5A and 5B, yet another embodiment of MR transducer 10 is shown. In this embodiment, MR transducer 10 is formed without separation structure 16 (FIG. 1). Accordingly, it is recognized that MR transducer 10 may include ESD element 11 without separation structure 16.

Figure 6:
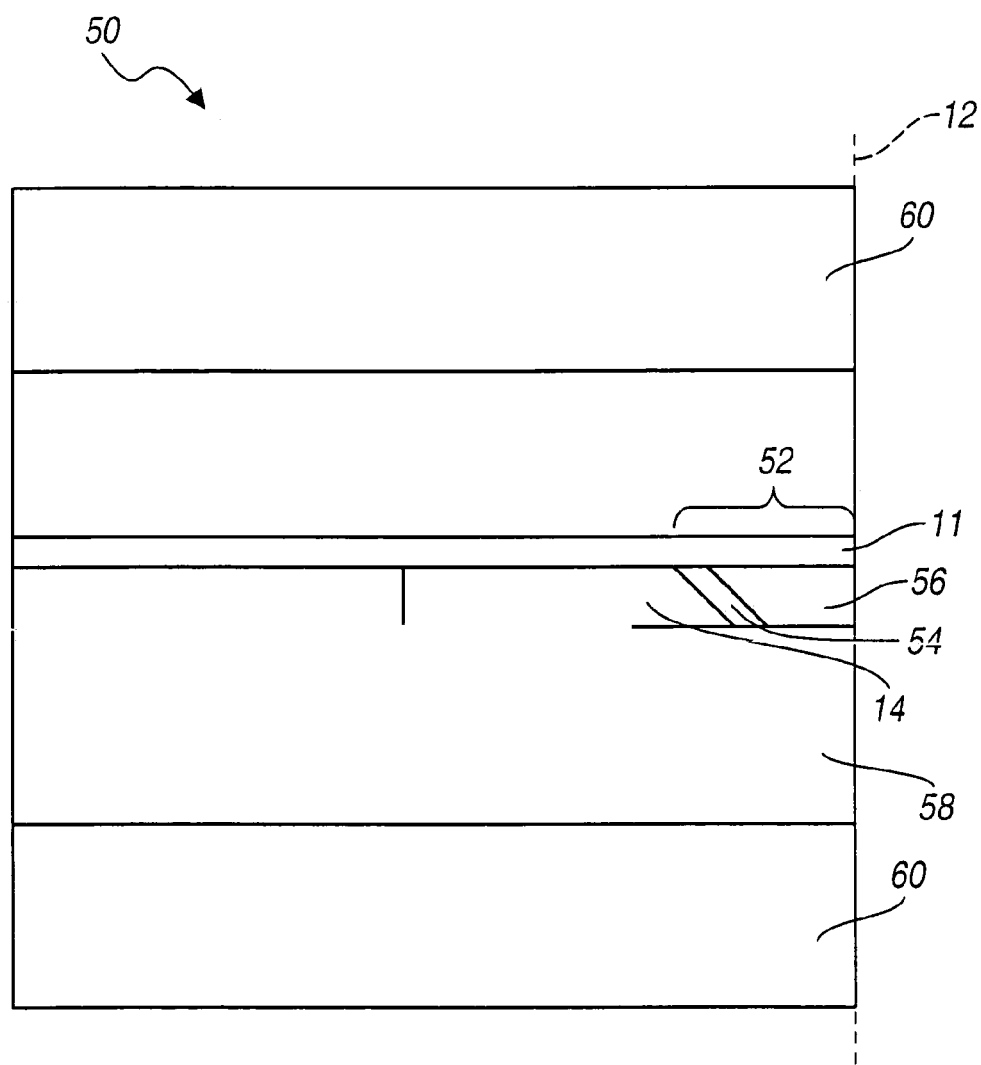
FIG. 6 illustrates a cross-sectional view of a MR transducer in accordance with yet another embodiment of the present invention.

Now referring to FIG. 6, an alternative embodiment of MR transducer 50 is illustrated having an alumina gap material 58 and a shield 60. Alumina gap material provides structural support for shield 60 and electrical isolation between MR sensor 14 and shield 60. As recognized by one of ordinary skill in the art, shield 60 is configured to block magnetic flux from neighboring tracks and up and downstream magnetic bits located on the tape, which enables improved resolution by MR sensor 14. As described above, ESD element 11 is configured to provide an electrical path from head-tape interface 12 to a lower voltage structure within the head or a grounding point. Accordingly, in one aspect of the invention, ESD element 11 may provide an electrical path from head-tape interface 12 to shield 60. In such an embodiment, charges that are built-up on head-tape interface 12 during an ESD event are discharged through ESD element 11 to shield 60.

Referring now to FIGS. 7A through 7G and 8A through 8D, a fabrication process for forming a MR transducer having an ESD element is shown in accordance with an embodiment of the present invention. The steps shown in FIGS. 7C through 7G illustrate the fabrication process for forming a MR transducer having a separation structure in addition to an ESD element. Alternatively, the steps shown in FIGS. 8A through 8D illustrate an embodiment of the fabrication process for forming a MR transducer having the ESD element absent the separation structure. In either embodiment, the views shown in FIGS. 7A through 7G and 8A through 8D are looking down at a top side of the MR transducer being fabricated. As such, the views shown in FIGS. 7A through 7G and 8A through 8D are top-down views like the top-down MR transducer views shown in FIGS. 2A, 2B, and 4 and 5B.

It is to be understood that each of FIGS. 7A through 7G and 8A through 8D may actually cover more than one actual fabrication step. For example, to proceed from FIG. 7A (MR sensor deposited as sheet film) to FIG. 7B (MR sensor pattern) photo definition and ion mill (or etch) steps are involved. A separation structure would then be deposited (FIG. 7C) in situ before any resist strip/lift off step. As such, the sequence of the fabrication process illustrated in FIGS. 7A through 7G and 8A through 8D is to be understood to include additional typical fabrication steps which are evident to those skilled in the art.

Figure 7A:
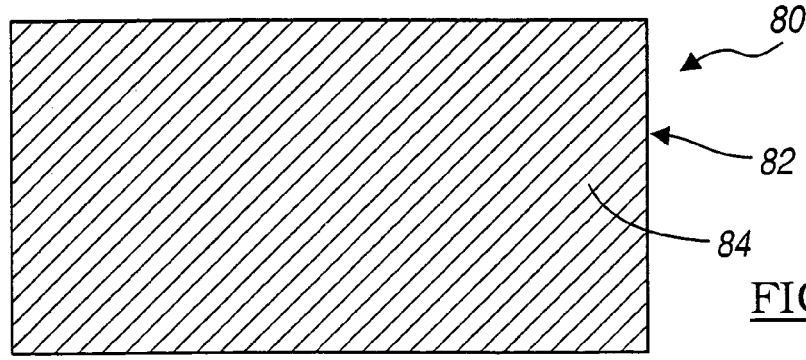
FIGS. 7A and 7B illustrate several initial steps in a fabrication process for forming a MR transducer in accordance with an embodiment of the present invention.

A first fabrication step 80 shown in FIG. 7A includes depositing a MR sensor sheet film 82 on a wafer having a base structure 84. As is known in the art, base structure 84 for a MR sensor typically includes the following sequence of layers from the bottom to the top: (AlTiC) substrate, insulating under-layer, patterned magnetic shield, and an insulating gap. MR sensor sheet film 82 is deposited over the insulating gap layer of base structure 84. MR sensor sheet film 82 includes the film stack which forms the MR sensor.

Figure 7B:
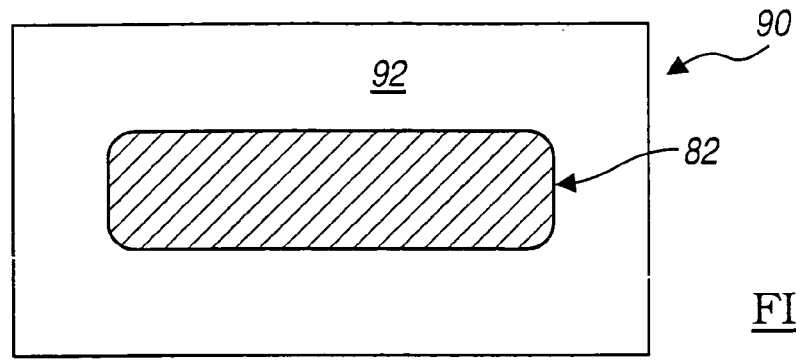

A second fabrication step 90 shown in FIG. 7B includes defining the MR sensor from the deposited MR sensor sheet film 82. Second fabrication step 90 is performed by defining the desired shape of the MR sensor with photo-resist through photolithography. The unprotected portion 92 of film stack 82 is then milled away leaving a desired portion of the MR sensor film stack 82 as shown in FIG. 7.

Figure 7C:
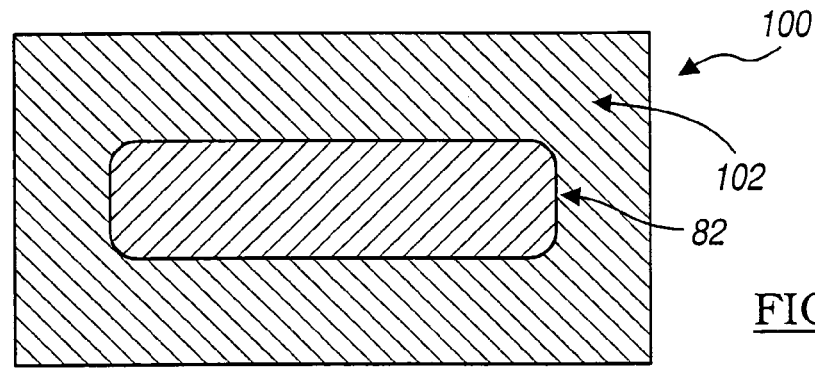
FIGS. 7C through 7G illustrate additional steps within the fabrication process following the steps illustrated in FIGS. 7A and 7B for forming a MR transducer having a separation structure and an electro-static discharge (ESD) element in accordance with an embodiment of the present invention.

A third fabrication step 100 shown in FIG. 7C includes defining an abutted junction (i.e., a separation structure) with separation structure material 102 around the remaining desired portion of MR sensor film stack 82. With the photo-resist remaining on MR sensor film stack 82 from the second fabrication step 90, the separation structure material 102 is deposited as a sheet film over the remaining MR sensor film stack 82 and the milled away portion 92. As will be described below, separation structure material 102 forms a separation structure such as separation structures 16 and 52. For example, to form separation structure 16, separation structure material 102 includes one deposition of a film layer which forms separation structure 16. As another example, to form separation structure 52, separation structure material 102 includes several depositions of film layers which form under-layer film 54 and isolation film 56 of separation structure 52. After the separation structure material 102 is deposited, the photo-resist is lifted off leaving the desired portion of MR sensor 82 surrounded by separation structure material 102 as shown in FIG. 7C.

Figure 7D:
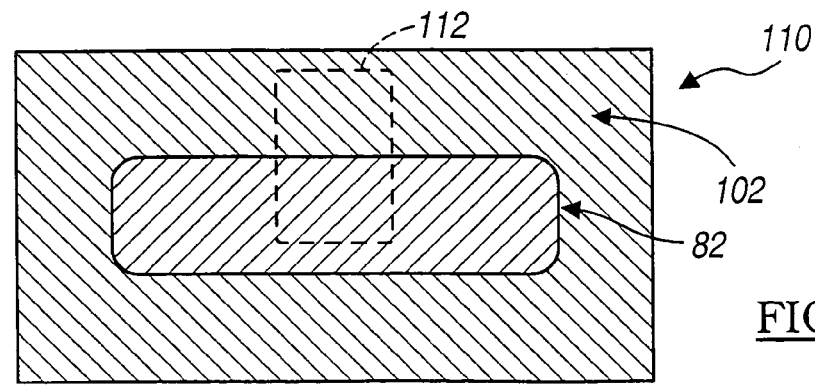
Figure 7E:
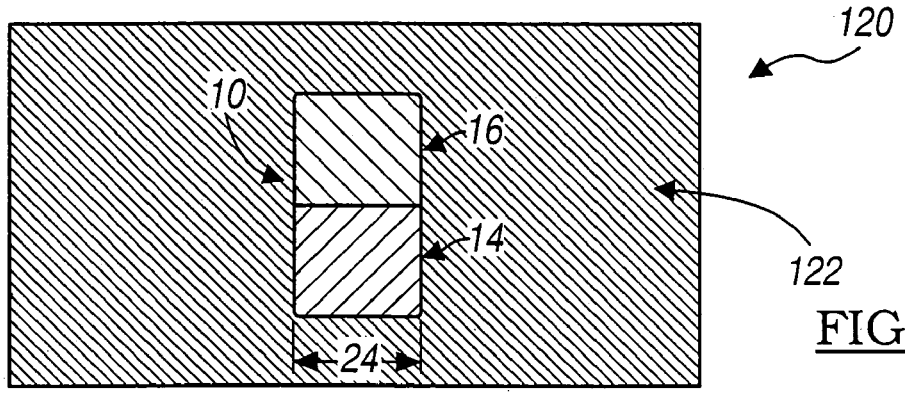

A fourth fabrication step 110 shown in FIG. 7D includes photo-defining a desired portion of MR sensor film stack 82 and separation structure material 102 as indicated by dashed line 112. The remaining portion of MR sensor film stack 82 and isolation junction material 102 are then milled away leaving MR sensor 14 and a separation structure such as separation structure 16 as shown in FIG. 7E. As shown in FIG. 7E, MR sensor 14 has width 24 which defines the physical read width of the MR sensor.

A fifth fabrication step 120 shown in FIG. 7E includes depositing a permanent magnet (PM) stabilization sheet film 122 on base substrate 84 and over the photo-resist still protecting MR sensor 14 and separation structure 16. PM stabilization sheet film 122 forms abutted junctions with MR sensor 14 and separation structure 16. After the photo-resist is lifted off, a MR transducer 10 remains as illustrated in FIG. 7E.

Figure 7F:
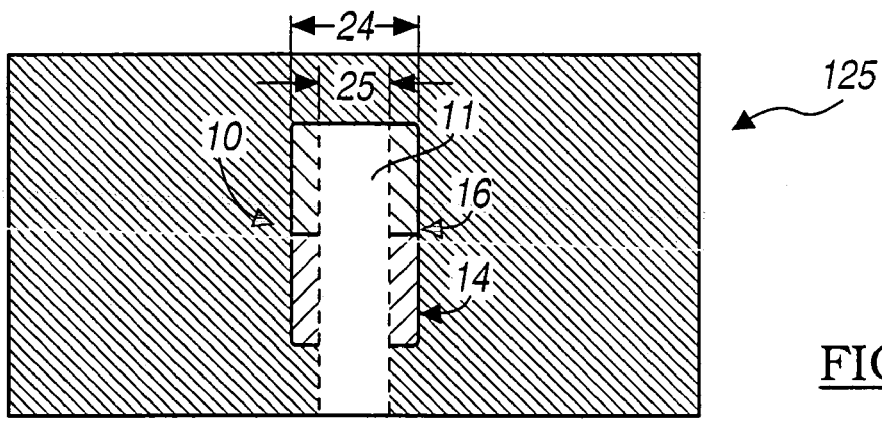

A sixth fabrication step 125 shown in FIG. 7F includes depositing an ESD element 11 over MR sensor 14 and separation structure 16. As described above, ESD element 11 may be comprised of a relatively high resistance metal or alternatively, a relatively low resistance material. Additionally, as shown, ESD element 11 has a width 25 that is less than width 24 wherein width 24 defines the physical read width of MR sensor 14.

Figure 7G:
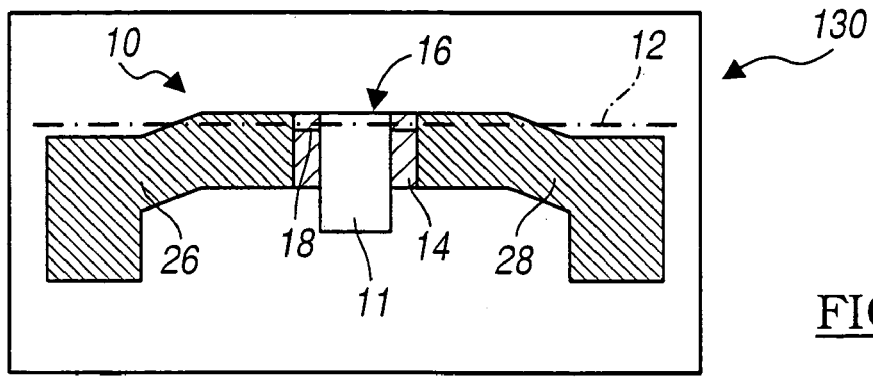

A seventh fabrication step 130 shown in FIG. 7G includes photo-defining and milling away unprotected portions of the ESD element 11, MR sensor film stack, the separation structure material, and PM stabilization sheet film 122 to define ESD element 11, MR sensor 14, separation structure 16, and patterned PM films 26, 28 prior to completion of the reader wafer build and lapping. The dashed line indicates the finished stripe height of MR sensor 14 after lapping which is set to be head-tape interface 12. As such, head-tape interface 12 is located within separation structure 16 and the distance from head-tape interface 12 to MR sensor 14 is minimized with sensing front edge 18 of the MR sensor not being in contact with the head-tape interface.

Figure 8A:
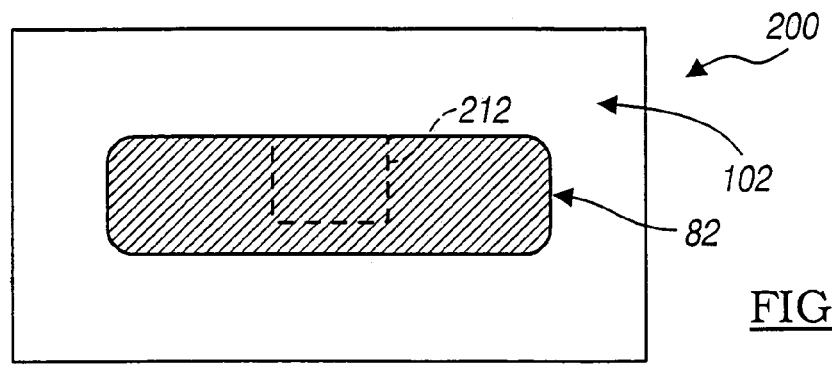
FIGS. 8A through 8D illustrate alternative steps of the fabrication process to those steps shown in FIGS. 7C through 7G for forming a MR transducer having an electro-static discharge (ESD) element absent a separation structure in accordance with an embodiment of the present invention.
Figure 8B:
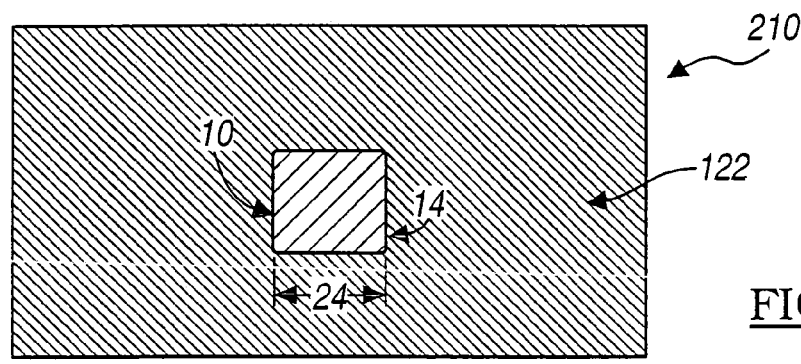

As discussed in the foregoing, fabrication of MR transducer 10 shown in FIGS. 5A and 5B does not require fabrication of separation structure 16. Accordingly, FIGS. 8A through 8D illustrate fabrication of the MR transducer 10 shown in FIGS. 5A and 5B. Prior to steps 200 through 230 occurring (FIGS. 8A through 8D), steps 80 and 90 (FIGS. 7A and 7B) occur as described above. Accordingly, in the alternative embodiment, following step 90 (FIG. 7B), step 200 (FIG. 8A) occurs, which includes photo-defining a desired portion of MR sensor film stack 82 as indicated by dashed line 212. The remaining portion of MR sensor film stack 82 is then milled away leaving MR sensor 14 as shown in FIG. 8B. As shown in FIG. 8B, MR sensor 14 has width 24 which defines the physical read width of the MR sensor 14.

A next step in the alternative fabrication process includes a step 210 wherein a permanent magnet (PM) stabilization sheet film 122 is deposited on base substrate 84 (FIG. 7A) and over the photo-resist still protecting MR sensor 14. As described above, PM stabilization sheet film 122 forms abutted junctions with MR sensor 14. After the photo-resist is lifted off, a MR transducer 10 remains as illustrated in FIG. 8B.

Figure 8C:
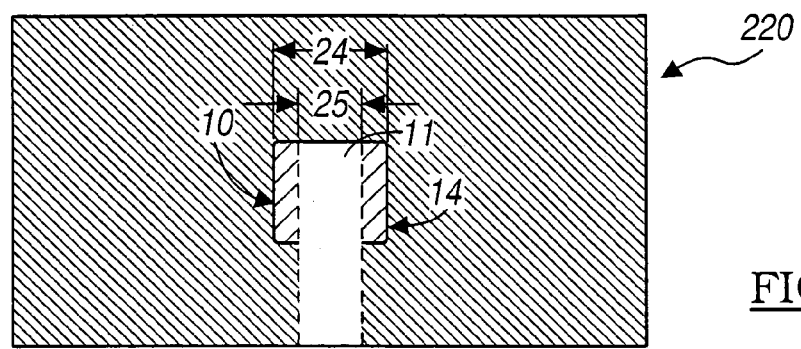

Another step in the alternative fabrication process includes a step 220 shown in FIG. 8C, wherein ESD element 11 is deposited on an area adjacent to MR sensor 14. As shown, ESD element 11 has a width 25 that is less than width 24 wherein width 24 defines the physical read width of MR sensor 14.

Figure 8D:
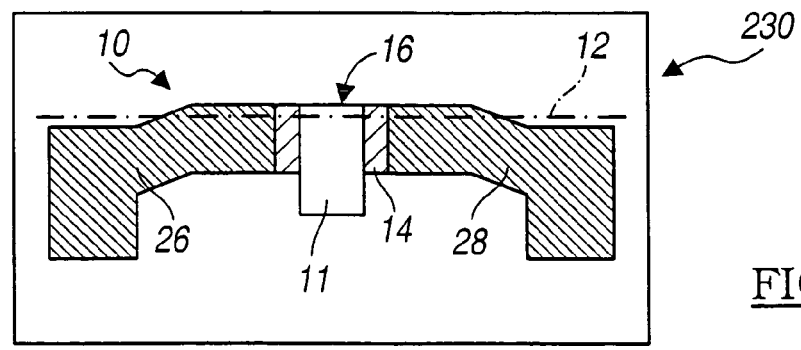

Yet another step is a step 230 shown in FIG. 8D that includes photo-defining and milling away unprotected portions of the ESD element 11, MR sensor film stack, and PM stabilization sheet film 122 to define ESD element 11, MR sensor 14, and patterned PM films 26, 28 prior to completion of the reader wafer build and lapping. The dashed line indicates the finished stripe height of MR sensor 14 and ESD element 11 after lapping which is set to be head-tape interface 12.

Thus, it is apparent that there has been provided, in accordance with the present invention, a MR transducer having an ESD element and alternatively, a separation structure separating a MR sensor from a head-tape interface, and method of making the same that fully satisfy the objects, aims, and advantages set forth above.

While embodiments of the present invention have been illustrated and described in the general context of MR sensors, it is not intended that these embodiments illustrate and describe all possible forms of the present invention. Accordingly, the present invention is equally applicable to virtually any magneto-resistive sensors including but not limited to giant magneto-resistive (GMR) sensors, anisotropic magneto-resistive (AMR) sensors, and tunneling magneto-resistive (TMR) sensors. As such, the words used in the specification are words of description rather than limitation, and it is understood that various changes may be made without departing from the spirit and scope of the present invention.

What is claimed is:

1. A magneto-resistive (MR) transducer for reading data signals magnetically recorded on tape, the transducer comprising:
   a MR sensor having a front edge;
   a separation structure including at least one film formed of at least one of non-magnetic or ferromagnetic materials, the separation structure is configured to contact the tape and is formed on the front edge of the MR sensor to isolate the MR sensor from contact with the tape; and
   an electro-static discharge (ESD) element coupled to at least one of the separation structure and the MR sensor and configured to contact the tape, the ESD element being further configured to provide an electrical path to a lower potential structure.

2. A transducer of claim 1, wherein the ESD element forms a serpentine resistive structure.

3. The transducer of claim 1 wherein the at least one film includes an isolation film and an underlying film and wherein the isolation film is positioned between the tape and the underlying film, and the underlying film is positioned between the isolation film and the MR sensor to isolate the MR sensor from contacting the isolation film.

4. The transducer of claim 3 wherein the isolation film is formed of at least one of chromium (Cr) and tantalum (Ta).

5. The transducer of claim 3 wherein the underlying film is formed of at least one of an alloy of cobalt, zirconium, and molybdenum (CoZrMo), an alloy of nickel, iron and molybdenum (NiFeMo), and an alloy of nickel, iron, and chromium (NiFeCr).

6. The transducer of claim 1 further comprising at least one permanent magnet (PM) film positioned about the MR sensor and configured to contact the tape to stabilize performance of the MR sensor.

7. A magneto-resistive (MR) transducer for reading data signals from a magnetic tape, the transducer comprising:
   an MR sensor;
   a separation structure formed about the MR sensor for contacting the tape and separating the MR sensor from the tape, and
   an electro-static discharge (ESD) element for contacting the MR sensor, the separation structure, and the tape and for dissipating electrical charges from the tape.

8. The transducer of claim 7 further comprising an insulator for contacting the MR sensor and the tape.

9. The transducer of claim 8 wherein the insulator is formed of an alumina gap material.

10. The transducer of claim 7 wherein the separation structure includes an isolation film and an underlying film and wherein the isolation film is positioned between the tape and the underlying film, and the underlying film is positioned between the isolation film and the MR sensor to isolate the MR sensor from contacting the isolation film.

11. The transducer of claim 10 wherein the isolation film is formed of at least one of chromium (Cr) and tantalum (Ta).

12. The transducer of claim 10 wherein the underlying film is formed of at least one of an alloy of cobalt, zirconium, and molybdenum (CoZrMo), an alloy of nickel, iron and molybdenum (NiFeMo), and an alloy of nickel, iron, and chromium (NiFeCr).

13. The transducer of claim 7 further comprising at least one permanent magnet (PM) film positioned about the MR sensor and configured to contact the tape to stabilize performance of the MR sensor.

14. A magneto-resistive (MR) transducer for reading data signals from a magnetic tape, the transducer comprising:
   an MR sensor;

an electro-static discharge (ESD) element configured to contact the MR sensor and the tape and to dissipate electrical charges from the tape; and at least one permanent magnet (PM) film positioned about the MR sensor and the ESD element and configured to contact the tape and to stabilize performance of the MR sensor.

15. The transducer of claim 14 further comprising a separation structure formed about the MR sensor and configured to contact the tape and to separate the MR sensor from the tape.

16. The transducer of claim 15 wherein the separation structure includes an isolation film and an underlying film and wherein the isolation film is positioned between the tape and the underlying film, and the underlying film is positioned between the isolation film and the MR sensor to isolate the MR sensor from contacting the isolation film.

17. The transducer of claim 16 wherein the isolation film is formed of at least one of chromium (Cr) and tantalum (Ta).

18. The transducer of claim 16 wherein the underlying film is formed of at least one of an alloy of cobalt, zirconium, and molybdenm (CoZrMo), an alloy of nickel, iron and molybdenum (NiFeMo), and an alloy of nickel, iron, and chromium (NiFeCr).

\* \* \* \* \*